(12) United States Patent
Feng

(10) Patent No.: US 7,859,198 B2
(45) Date of Patent: Dec. 28, 2010

(54) BACKLIGHT MODULE HAVING DETECTING CIRCUIT AND DIRECT CURRENT VOLTAGE COMPENSATION CIRCUIT

(75) Inventor: Sha Feng, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 416 days.

(21) Appl. No.: 12/154,837

(22) Filed: May 27, 2008

(65) Prior Publication Data

US 2009/0001903 A1    Jan. 1, 2009

(30) Foreign Application Priority Data

May 25, 2007    (CN)    .................... 2007 1 0074611

(51) Int. Cl.
*H05B 37/02*    (2006.01)
(52) U.S. Cl. ...................... 315/308; 315/312
(58) Field of Classification Search ............. 315/209 R, 315/246, 250, 291, 307, 308, 312, 324; 345/102
See application file for complete search history.

(56) References Cited

U.S. PATENT DOCUMENTS

| | | | |
|---|---|---|---|
| 4,723,098 A | 2/1988 | Grubbs | |
| 6,919,697 B2 * | 7/2005 | Jang | 315/291 |
| 7,224,129 B2 * | 5/2007 | Maeda et al. | 315/277 |
| 7,227,316 B2 * | 6/2007 | Lu | 315/308 |
| 7,242,147 B2 * | 7/2007 | Jin | 315/177 |
| 7,288,903 B2 * | 10/2007 | Jang et al. | 315/307 |
| 7,332,871 B2 | 2/2008 | Lu | |
| 7,402,957 B2 * | 7/2008 | Shimura et al. | 315/276 |
| 7,492,106 B2 * | 2/2009 | Sengoku et al. | 315/276 |
| 2007/0103093 A1 * | 5/2007 | Hagen et al. | 315/291 |

* cited by examiner

*Primary Examiner*—Thuy Vinh Tran
(74) *Attorney, Agent, or Firm*—Wei Te Chung

(57) ABSTRACT

An exemplary backlight module includes lamps (21), a power supply circuit (20), a detecting circuit (22), and a direct current voltage compensation circuit (23). The power supply circuit is configured for supplying a driving voltage to the lamps. The first detecting circuit is configured for detecting a direct current voltage component of the driving voltage at one end of one of the lamps. The first direct current voltage compensation circuit is configured for providing a compensation direct current voltage to an opposite end of all the lamps according to the detected direct current voltage component.

17 Claims, 4 Drawing Sheets

BACKLIGHT MODULE HAVING DETECTING CIRCUIT AND DIRECT CURRENT VOLTAGE COMPENSATION CIRCUIT

FIELD OF THE INVENTION

The present invention relates to backlight modules such as those used with liquid crystal displays (LCDs), and particularly to a backlight module having a detecting circuit and a direct current voltage compensation circuit.

GENERAL BACKGROUND

Liquid crystal displays are commonly used as displays for compact electronic apparatuses. Because the liquid crystal in an LCD does not emit any light itself, the liquid crystal requires a light source to clearly and sharply display text and images. Therefore a typical LCD requires an accompanying backlight module, in order to ensure that images with sufficient, uniform brightness can be displayed.

Referring to FIG. 3, a typical backlight module includes a power supply circuit 10 and a plurality of lamps 11. Each lamp 11 includes a high voltage end and a low voltage end. The power supply circuit 10 is connected to the high voltage ends of the lamps 11, and provides alternating current voltages for the lamps 11. The low voltage ends of the lamps 11 are connected to ground. The lamps 11 are cold cathode fluorescent lamps (CCFLs).

FIG. 4 illustrates a waveform diagram of an ideal working voltage when a selected one of the lamps 11 is working. The ideal working voltage is a perfect sine waveform, that is, the ideal working voltage does not include any direct current component. The average value of the ideal working voltage is 0 volts.

FIG. 5-6 illustrate waveform diagrams of real working voltages when the selected lamp 11 is working. The real working voltages generally include direct current components. In FIG. 5, the real working voltage includes a direct current component Va greater than 0 volts. In FIG. 6, the real working voltage includes a direct current component Vb less than 0 volts.

The direct current component Va may force mercury ions in the lamp 11 toward the low voltage end. The direct current component Vb may force mercury ions in the lamp 11 toward the high voltage end. These may result in an accumulation of mercury ions at either end of the lamp 11. Thus, the distribution of mercury ions may become non-uniform. When this happens, the brightness of the lamps 11 is non-uniform, and a working lifetime of the lamp 11 is shortened. Accordingly, the performance of the backlight module is diminished.

What is needed, therefore, is a backlight module that can overcome the above-described deficiencies.

SUMMARY

In one preferred embodiment, a backlight module includes at least one first lamp, a power supply circuit, a first detecting circuit and a first direct current voltage compensation circuit. The power supply circuit is configured for supplying a first driving voltage to the at least one first lamp. The first detecting circuit is configured for detecting a first direct current voltage component of the first driving voltage at one end of the at least one first lamp. The first direct current voltage compensation circuit is configured for providing a first compensation direct current voltage to an opposite end of the at least one first lamp according to the first direct current voltage component.

Other novel features and advantages of the present backlight module will become more apparent from the following detailed description when taken in conjunction with the accompanying drawings. In the drawings, all the views are schematic.

DETAILED DESCRIPTION OF PREFERRED EMBODIMENTS

Figure 1:
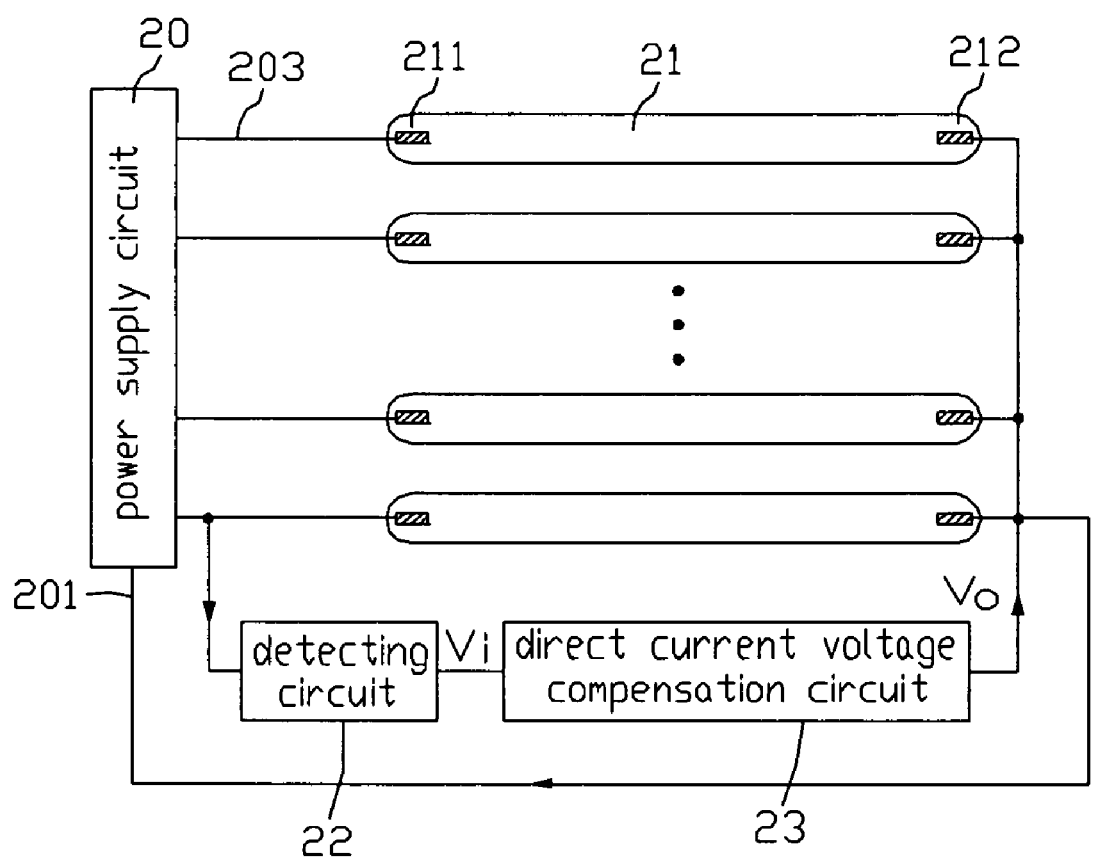
FIG. 1 is essentially an abbreviated circuit diagram of a backlight module according to a first embodiment of the present invention.

Reference will now be made to the drawing figures to describe various embodiments of the present invention in detail.

FIG. 1 shows an abbreviated circuit diagram of a backlight module according to a first embodiment of the present invention. The backlight module includes a plurality of lamps 21, a power supply circuit 20, a detecting circuit 22, and a direct current voltage compensation circuit 23.

The backlight module is a direct-type backlight module. The lamps 21 are disposed parallel to each other. Each lamp 21 includes a high voltage end 211 and a low voltage end 212. All the high voltage ends 211 are located at one side of the backlight module, and all the low voltage ends 212 are located at an opposite side of the backlight module. The lamps 21 are typically cold cathode fluorescent lamps (CCFLs).

The power supply circuit 20 includes a plurality of output terminals 203, and an input terminal 201. The output terminals 203 are connected to the high voltage ends 211 respectively. All the low voltage ends 212 are connected to the input terminal 201. An input terminal (not labeled) of the detecting circuit 22 is connected to the high voltage end 211 of one of the lamps 21. An output terminal (not labeled) of the detecting circuit 22 is connected to an input terminal (not labeled) of the direct current voltage compensation circuit 23. An output terminal (not labeled) of the direct current voltage compensation circuit 23 is connected to all the low voltage ends 212 of the lamps 21.

The power supply circuit 20 provides alternating current voltages for the lamps 21. The alternating current voltage at each lamp 21 is generally divided into a main alternating current voltage component and an undesired direct current voltage component. The detecting circuit 22 is configured for detecting the direct current voltage component at the corresponding lamp 21. The direct current voltage compensation circuit 23 is configured for providing a compensation direct current voltage to the low voltage ends 212 of the lamps 21 according to the direct current voltage component detected by the detecting circuit 22.

When the backlight module is working, the detecting circuit 22 detects the direct current voltage component at the high voltage end 211 of the corresponding lamps 21. For example, the measured direct current voltage component is Vi. Accordingly, the direct current voltage compensation circuit 23 provides a compensation direct current voltage Vo to the low voltage ends 212. Vo is equal to Vi. That is, a value and a polarity (positive or negative) of Vo are the same as those of Vi. Direct current voltages at the low voltage ends 212 are compensated by the compensation direct current voltage Vo, such that a difference between the direct current voltages at the high voltage end 211 and the low voltage end 212 of each lamp 21 is zero. Thus, no direct current component flows through any of the lamps 21.

Unlike in a conventional backlight module, the present backlight module includes the detecting circuit 22 and the direct current voltage compensation circuit 23. The direct current voltage compensation circuit 23 provides compensation direct current voltages Vo to the lamps 21 according to the direct current voltage component detected by the detecting circuit 22. As a result, there is essentially no direct current component flowing through each of the lamps 21. Thus, accumulation of mercury ions at either end of each of the lamps 21 is avoided. Uniform distribution of the mercury ions can be maintained, so that the brightness of the lamps 21 is correspondingly uniform. Thus the backlight module provides improved performance and has a longer working lifetime.

Figure 2:
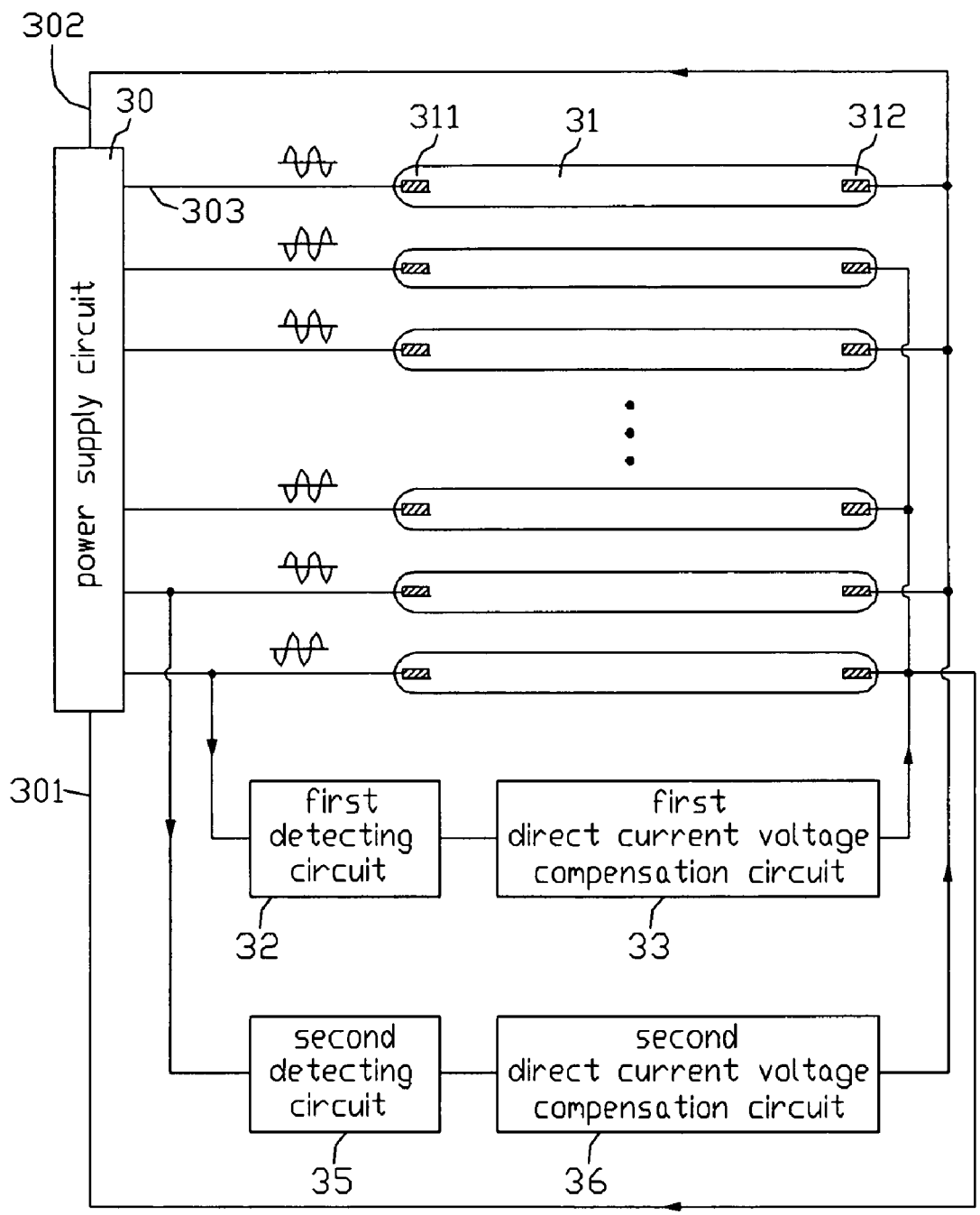
FIG. 2 is essentially an abbreviated circuit diagram of a backlight module according to a second embodiment of the present invention.
Figure 3:
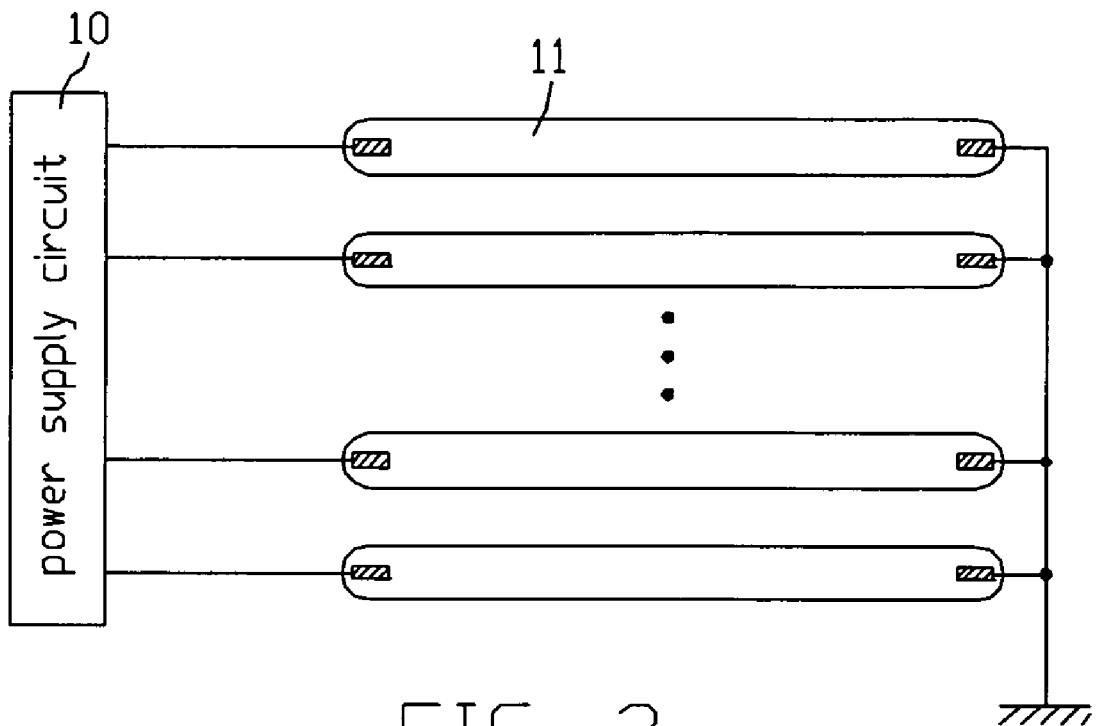
FIG. 3 is essentially an abbreviated circuit diagram of a conventional backlight module, the backlight module including a plurality of lamps.
Figure 4:
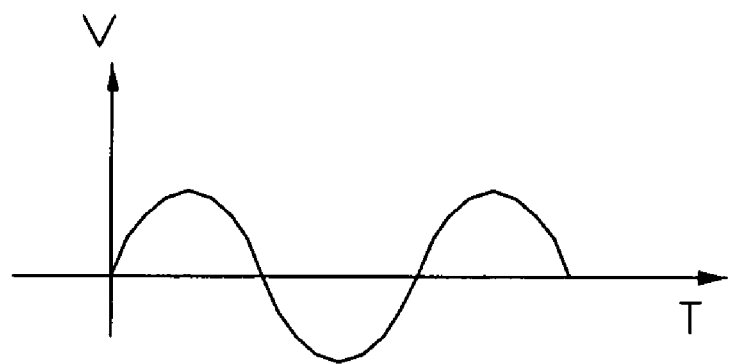
FIG. 4 is a graph of voltage (V) versus time (T), showing an ideal waveform of an alternating current voltage supplied to a selected one of the lamps of the backlight module of FIG. 3.
Figure 5:
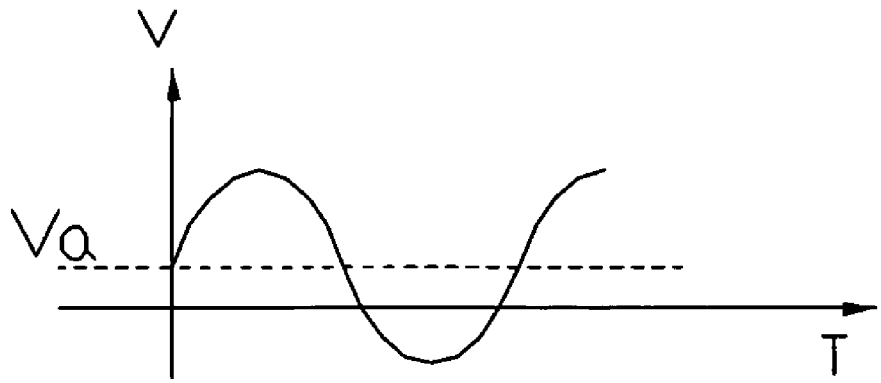
FIG. 5 is similar to FIG. 4, but showing a real waveform diagram of an alternating current voltage supplied to the selected lamp of the backlight module, showing a direct current voltage component of the alternating current voltage being greater than 0 volts.
Figure 6:
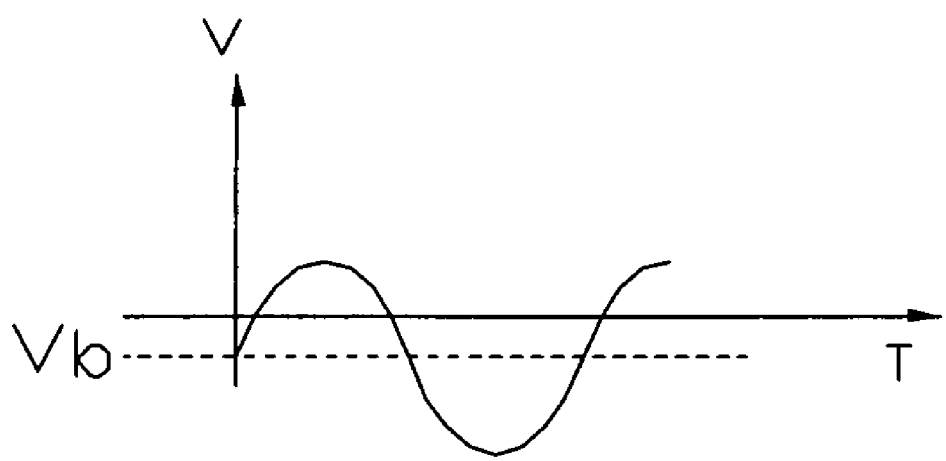
FIG. 6 is similar to FIG. 4, but showing a real waveform diagram of an alternating current voltage supplied to the selected lamp of the backlight module, showing a direct current voltage component of the alternating current voltage being less than 0 volts.

Referring to FIG. 2, a circuit diagram of a backlight module according to a second embodiment of the present invention is shown. The backlight module includes a plurality of lamps 31, a power supply circuit 30, a first detecting circuit 32, a second detecting circuit 35, a first direct current voltage compensation circuit 33, and a second direct current voltage compensation circuit 36. The first detecting circuit 32 is similar to the second detecting circuit 35. The first direct current voltage compensation circuit 33 is similar to the second direct current voltage compensation circuit 36.

The lamps 31 are disposed parallel to each other. Each lamp 31 includes a high voltage end 311 and a low voltage end 312. All the high voltage ends 311 are located at one side of the backlight module, and all the low voltage ends 312 are located at an opposite side of the backlight module. The lamps 31 are typically cold cathode fluorescent lamps (CCFLs).

The power supply circuit 30 includes a plurality of output terminals 303, a first input terminal 301, and a second input terminal 302. Odd-numbered output terminals 303 are connected to the high voltage ends 311 of odd-numbered lamps 31, respectively. Even-numbered output terminals 303 are connected to the high voltage ends 311 of even-numbered lamps 31, respectively. All the low voltage ends 312 of the even-numbered lamps 31 are connected to the first input terminal 301. All the low voltage ends 312 of the odd-numbered lamps 31 are connected to the second input terminal 302.

An input terminal (not labeled) of the first detecting circuit 32 is connected to the high voltage end 311 of one of the even-numbered lamps 31. An output terminal (not labeled) of the first detecting circuit 32 is connected to an input terminal (not labeled) of the first direct current voltage compensation circuit 33. An output terminal (not labeled) of the first direct current voltage compensation circuit 33 is connected to all the low voltage ends 312 of the even-numbered lamps 31.

An input terminal (not labeled) of the second detecting circuit 35 is connected to the high-voltage end 311 of one of the odd-numbered lamps 31. An output terminal (not labeled) of the second detecting circuit 35 is connected to an input terminal (not labeled) of the second direct current voltage compensation circuit 36. An output terminal (not labeled) of the second direct current voltage compensation circuit 36 is connected to all the low voltage ends 312 of the odd-numbered lamps 31.

The power supply circuit 30 provides alternating current voltages for the lamps 31. The alternating current voltage at each lamp 31 is generally divided into a main alternating current voltage component and an undesired direct current voltage component. Phases of the alternating current voltages provided to the odd-numbered lamps 31 are the reverse of phases of the alternating current voltages provided to the even-numbered lamps 31. For example, initial phases of the alternating current voltages provided to the odd-numbered lamps 31 are positive, and initial phases of the alternating current voltages provided to the even-numbered lamps 31 are negative.

The first detecting circuit 32 is configured for detecting the direct current voltage component of the corresponding even-numbered lamp 31. The first direct current voltage compensation circuit 33 is configured for providing a compensation direct current voltage to the low voltage ends 312 of the even-numbered lamps 31 according to the direct current voltage component detected by the first detecting circuit 32.

When the backlight module is working, the first detecting circuit 32 detects the direct current voltage component at the high voltage end 311 of the corresponding even-numbered lamp 31. Accordingly, the first direct current voltage compensation circuit 33 provides a compensation direct current voltage to the low voltage ends 312 of the even-numbered lamps 31. The compensation direct current voltage is equal to the direct current voltage component. Thus, a difference between the direct current voltages at the high voltage end 311 and the low voltage end 312 of each even-numbered lamp 31 is zero. Accordingly, no direct current component flows through any of the even-numbered lamps 31.

The second detecting circuit 35 is configured for detecting a direct current voltage component of the corresponding odd-numbered lamp 31. The second direct current voltage compensation circuit 36 is configured for providing a compensation direct current voltage to the low voltage ends 312 of the odd-numbered lamps 31 according to the direct current voltage component detected by the second detecting circuit 35.

When the backlight module is working, the second detecting circuit 33 detects the direct current voltage component at the high voltage end 311 of the corresponding odd-numbered lamp 31. Accordingly, the second direct current voltage compensation circuit 33 provides a compensation direct current voltage to the low voltage ends 312 of the odd-numbered lamps 31. The compensation direct current voltage is equal to the direct current voltage component. Thus, a difference between the direct current voltages at the high voltage end 311 and the low voltage end 312 of each odd-numbered lamp 31 is zero. Accordingly, no direct current component flows through any of the odd-numbered lamps 31.

Compared to the backlight module of the first embodiment, the power supply circuit 30 provides alternating current voltages with reversed phases to the odd-numbered lamps 31 and the even-numbered lamps 31 respectively. Therefore the direct current components flowing through the odd-numbered lamps 31 and the even-numbered lamps 31 may be different. The backlight module of the second embodiment includes the first detecting circuit 32, the second detecting circuit 35, the first direct current voltage compensation circuit 33, and the second direct current voltage compensation circuit 36. Thus, the odd-numbered lamps 31 and the even-numbered lamps 31 can be detected, respectively, and then compensated accordingly.

In further and/or alternative embodiments, the backlight module of the first embodiment can include only one lamp. The backlight module of the second embodiment can include only two lamps. In both the first and second embodiments, the relevant detecting circuit can detect the direct current voltage component at the low voltage end of one of the lamps, and the relevant direct current voltage compensation circuit can provide compensation direct current voltages to the high voltage ends of the relevant lamps.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module, comprising:
    at least one first lamp;
    a power supply circuit configured for supplying a first driving voltage to the at least one first lamp;
    a first detecting circuit configured for detecting a first direct current voltage component of the first driving voltage at one end of at least one of the at least one first lamp; and
    a first direct current voltage compensation circuit configured for providing a first compensation direct current voltage to an opposite end of each of the at least one first lamp according to the detected first direct current voltage component.

2. The backlight module of claim 1, wherein the at least one first lamp comprises a high voltage end and a low voltage end, the first detecting circuit detects the direct current voltage component at the high voltage end of said at least one of the at least one first lamp, and the first direct current voltage compensation circuit provides the first compensation direct current voltage to the low voltage end of each of the at least one first lamp.

3. The backlight module of claim 1, wherein the first compensation direct current voltage is equal to the detected first direct current voltage component.

4. The backlight module of claim 1, further comprising:
    at least one second lamp capable of receiving a second driving voltage from the power supply circuit;
    a second detecting circuit configured for detecting a second direct current voltage component of the second driving voltage at one end of at least one of the at least one second lamp; and
    a second direct current voltage compensation circuit configured for providing a second compensation direct current voltage to the opposite end of each of the at least one second lamp according to the detected second direct current voltage component.

5. The backlight module of claim 4, wherein the second compensation direct current voltage is equal to the detected second direct current voltage component.

6. The backlight module of claim 4, wherein an initial phase of the first driving voltage provided to each of the at least one first lamp is opposite to an initial phase of the second driving voltage provided to each of the at least one second lamp.

7. The backlight module of claim 4, wherein the at least one first lamp and the at least one second lamp are alternately arranged.

8. The backlight module of claim 4, wherein the at least one first lamp and the at least one second lamp are cold cathode fluorescent lamps (CCFLs).

9. The backlight module of claim 1, wherein the backlight module is a direct-type backlight module.

10. A backlight module, comprising:
    at least one first lamp;
    a power supply circuit, the power supply circuit being connected to a high voltage end of each of the at least one first lamp for supplying a first driving voltage to each of the at least one first lamp;
    a first detecting circuit, an input terminal of the first detecting circuit being connected to the high voltage end of one of the at least one first lamp, for detecting a first direct current voltage component of the first driving voltage; and
    a first direct current voltage compensation circuit, an input terminal of the first direct current voltage compensation circuit being connected to an output terminal of the detecting circuit, an output terminal of the first direct current voltage compensation circuit being connected to a low voltage end of each of the at least one first lamp, the first direct current voltage compensation circuit providing a first compensation direct current voltage to the low voltage end of each of the at least one first lamp according to the detected first direct current voltage component.

11. The backlight module of claim 10, wherein the first compensation direct current voltage is equal to the detected first direct current voltage component.

12. The backlight module of claim 10, further comprising:
    at least one second lamp, a high voltage end of the at least one second lamp being connected to the power supply circuit, receiving a second driving voltage;
    a second detecting circuit, an input terminal of the second detecting circuit being connected to the high voltage end of the at least one second lamp, for detecting a second direct current voltage component; and
    a second direct current voltage compensation circuit, an input terminal of the second direct current voltage compensation circuit being connected to an output terminal of the second detecting circuit, an output terminal of the second direct current voltage compensation circuit being connected to a low voltage end of the at least one second lamp, the second direct current voltage compensation circuit providing a second compensation direct current voltage to the low voltage end of the at least one second lamp according to the second direct current voltage component.

13. The backlight module of claim 12, wherein the second compensation direct current voltage is equal to the second direct current voltage component of the second driving voltage.

14. The backlight module of claim 12, wherein an initial phase of the driving voltage provided to the at least one first lamp is reversed related to an initial phase of the driving voltage provided to the second lamp.

15. The backlight module of claim 14, wherein the at least one first and the at least one second lamps are cold cathode fluorescent lamps (CCFLs).

16. The backlight module of claim 12, wherein the at least one first lamp and the at least one second lamp are arranged at intervals.

17. The backlight module of claim 10, wherein the backlight module is a direct-type backlight module.

* * * * *